: US008011108B2

(12) United States Patent
Upthegrove

(10) Patent No.: US 8,011,108 B2
(45) Date of Patent: Sep. 6, 2011

(54) LEVELING DEVICE

(76) Inventor: Robert Upthegrove, Port Austin, MI (US)

( * ) Notice: Subject to any disclaimer, the term of this patent is extended or adjusted under 35 U.S.C. 154(b) by 38 days.

(21) Appl. No.: 12/384,306

(22) Filed: Apr. 2, 2009

(65) Prior Publication Data
US 2009/0249631 A1 Oct. 8, 2009

Related U.S. Application Data

(60) Provisional application No. 61/123,115, filed on Apr. 4, 2008.

(51) Int. Cl.
*G01C 9/00* (2006.01)
(52) U.S. Cl. .............................. 33/371; 33/382
(58) Field of Classification Search .................. 33/365, 33/370, 371, 381, 382, 474, 479, 481, 451, 33/518
See application file for complete search history.

(56) References Cited

U.S. PATENT DOCUMENTS

| 232,982 | A | * | 10/1880 | Langdon | 33/382 |
|---|---|---|---|---|---|
| 1,200,410 | A | * | 10/1916 | Chemrinsky | 33/370 |
| 1,210,339 | A | * | 12/1916 | Maddox | 33/410 |
| 2,084,053 | A | * | 6/1937 | Wilson | 33/350 |
| 2,727,314 | A | * | 12/1955 | Dossie et al. | 33/348 |
| 2,752,692 | A | * | 7/1956 | Smith | 33/374 |
| 2,901,836 | A | * | 9/1959 | Hall | 33/373 |
| 3,146,529 | A | | 9/1964 | Chamberlin | |
| 3,303,569 | A | * | 2/1967 | Wyatt | 33/343 |
| 4,407,075 | A | | 10/1983 | MacDernott | |
| 4,531,301 | A | * | 7/1985 | Tau | 33/382 |
| 4,663,856 | A | * | 5/1987 | Hall et al. | 33/373 |
| 5,020,232 | A | | 6/1991 | Whiteford | |
| 5,075,978 | A | | 12/1991 | Crowe | |
| D343,131 | S | | 1/1994 | Self | |
| 6,070,336 | A | * | 6/2000 | Rodgers | 33/613 |
| 6,748,665 | B1 | | 6/2004 | Samp | |
| 2003/0136013 | A1 | * | 7/2003 | Charay et al. | 33/370 |
| 2009/0229136 | A1 | * | 9/2009 | Howard | 33/301 |

* cited by examiner

*Primary Examiner* — Christopher W Fulton
(74) *Attorney, Agent, or Firm* — Robert L. McKellar; McKellar IP Law, PLLC

(57) ABSTRACT

A novel and useful leveling device and more specifically a leveling device which is primarily constructed for the purpose of constructing walls. The device has three glass level components that provide the user with not only side to side leveling of the wall, but also a front to back leveling.

1 Claim, 2 Drawing Sheets

LEVELING DEVICE

This application claims priority from U.S. provisional patent application Ser. No. 61/123,115 filed Apr. 4, 2008.

The present invention deals with a device this is capable of providing three readings for leveling of a construction project.

BACKGROUND OF THE INVENTION

The present invention relates to a novel and useful leveling device and more specifically to a leveling device which is primarily constructed for the purpose of constructing walls.

The device has three glass level components that provide the user with not only side to side leveling of the wall, but also a front to back leveling. Two of the glass level components are provided for the front to back leveling function and are located such that if one cannot read one of the glass level components, then the other is visible to the user.

Levels are common in construction in order to make sure that the construction project is horizontally disposed and is maintained level as the construction proceeds. The most common form of level is that which is straight, relatively narrow, and elongated and is constructed of typically wood, aluminum, or plastic.

One such level known in the prior art can be found in U.S. Pat. No. 3,146,529 that issued to Chamberlin, on Sep. 1, 1964 in which there is disclosed a house trailer leveling indicator that attaches to trailer houses so that they can be jacked up and leveled.

Another level can be found in Design Pat. No. 343,131 issued Jan. 11, 1994 to James Self that is described as a universally directional level for installing cement blocks. This level is in the form of a cross and has a centrally located glass level component.

Illuminated levels are currently popular and can be found in the following patents.

U.S. Pat. No. 6,748,665, that issued Jun. 15, 2004 to Samp describes an illuminated spirit level that can be used in airplanes in the event that the electricity goes out.

U.S. Pat. No. 4,507,075 that issued to MacDernott discloses a level that is illuminated at both ends and U.S. Pat. No. 5,020,232 that issued to Whiteford discloses an illuminated level in which each bubble vial is illuminated by an individual light emitting diode energized from a battery supported within the body of the level.

U.S. Pat. No. 5,075,978 that issued to Crowe discloses a level that has a dual battery configuration that illuminated the bubble tubes.

There is shown a level having a notch in the base element and two glass levels in MIGHTY-TEE-RETAINING-WALL-LEVEL-PLASTIC publication from the internet dated Apr. 13, 2007.

None of the devices of the prior art have the advantages of the device of this invention.

THE INVENTION

This invention comprises a leveling device for wall construction, said leveling device comprising a tee structure wherein there is a base element and a tee bar.

The base element has a bottom with a mid-point, a top, two opposing sides, a front end, and a back end and the base element contains a first glass level component mounted in the top and a second glass level component mounted through the sides.

In addition, the base element has a notch in the bottom with one end of the notch being located at or near the bottom mid-point and opening towards the base element front.

The tee bar has a top, a bottom, front side and a back opposing side, and two opposing ends wherein the top has a Midpoint.

The tee bar has a third glass level component mounted in the top at essentially the top midpoint and the front of the base element is fixed perpendicularly to the back side of the tee bar wherein the top of the base element and top of the tee bar are on the same level.

DETAILED DESCRIPTION OF THE INVENTION

Figure 1:
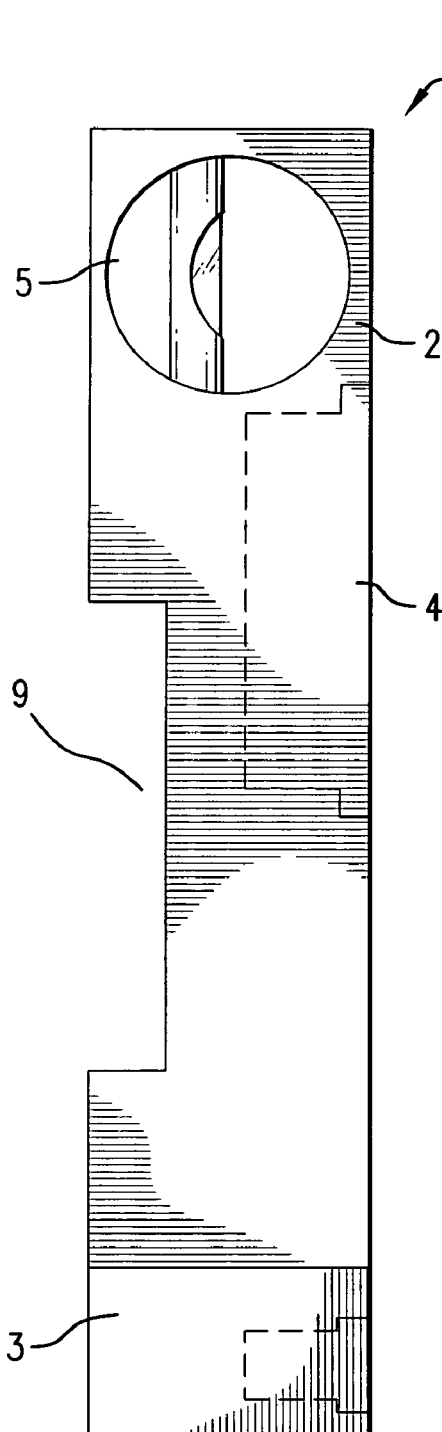
FIG. 1 is a full side view of a device of this invention.

FIG. 1 is a full side view of device 1 of this invention showing the base element 2 and the tee bar 3. Because this is a full side view, the tee bar shows as an end view.

Figure 2:
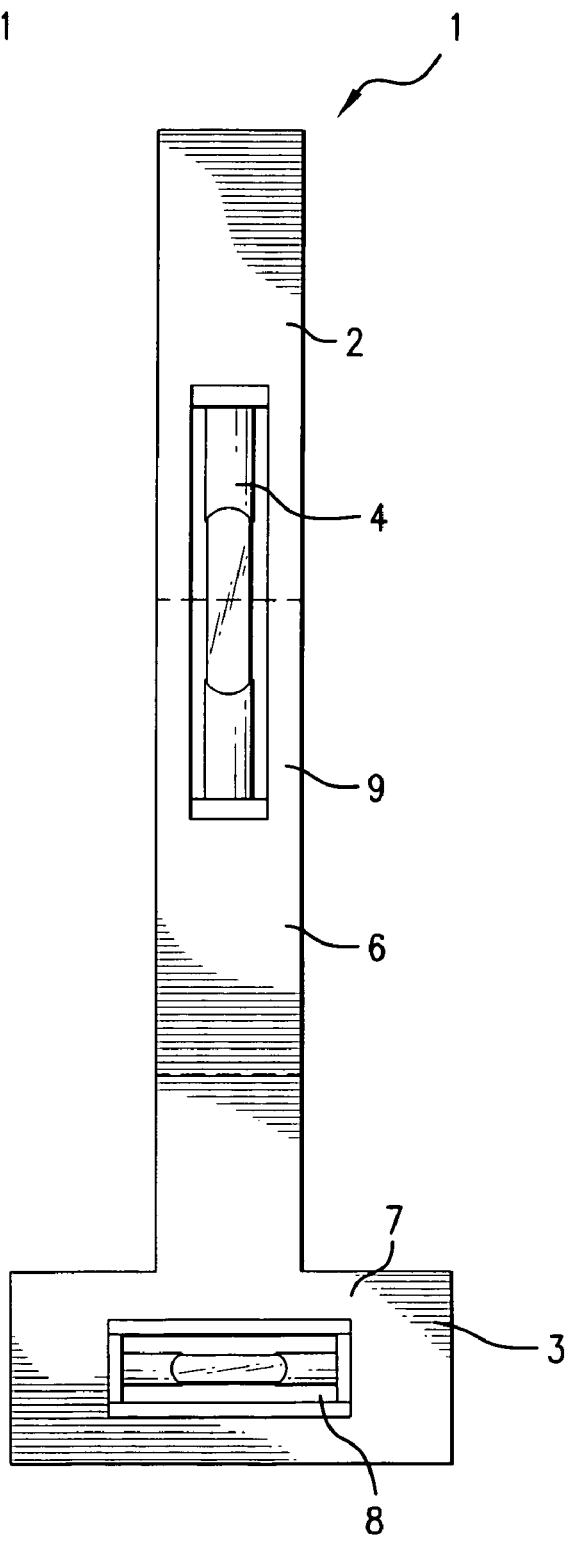
FIG. 2 is a full top view of a device of this invention.

FIG. 2 is a full top view of a device 1 of this invention, showing the base element 2 and the tee bar 3 wherein the first and second glass levels 4 and 5 are shown. Glass level is shown in the top 6 of the base element 2 and the glass level 5 is shown in the top 7 of the tee bar 3. Glass levels 4 and 5 are also shown in phantom in FIG. 1.

The third glass level 8 is shown in FIG. 1 along with the notch 9.

Figure 4:
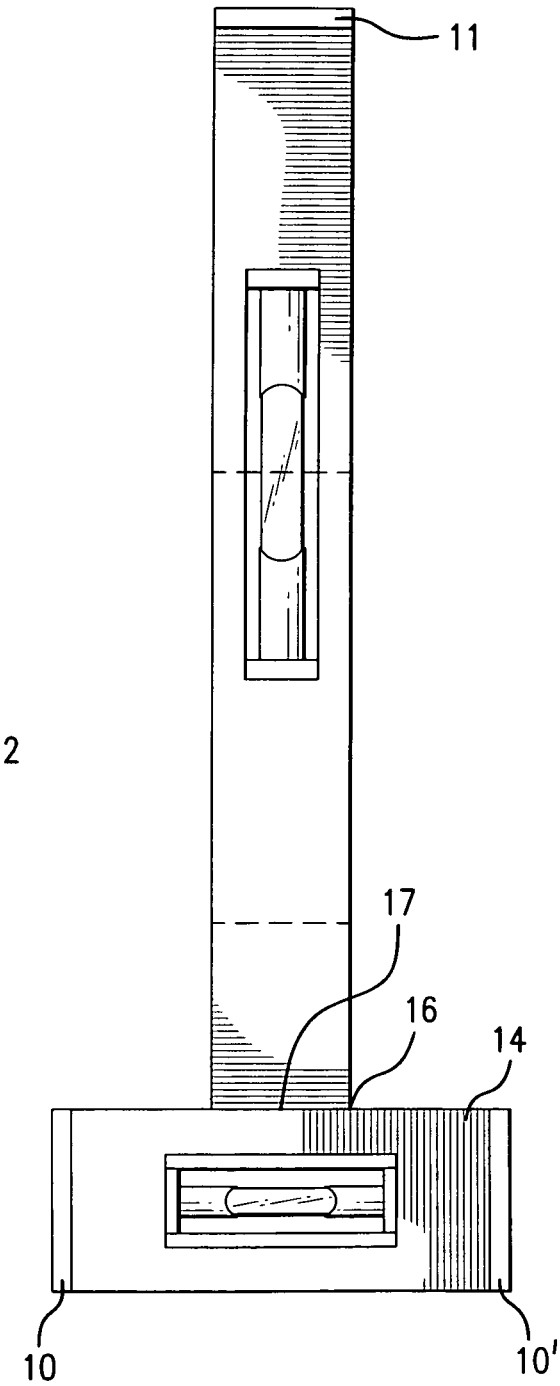
FIG. 4 is a full top view of a device of this invention with the end plates shown.

FIG. 4 is a full top view of a device 1 of this invention showing the various end plates of the device 1. There are end plates 10 and 10' on the tee bar 3 and an end plate 11 on the base element 2.

Figure 3:
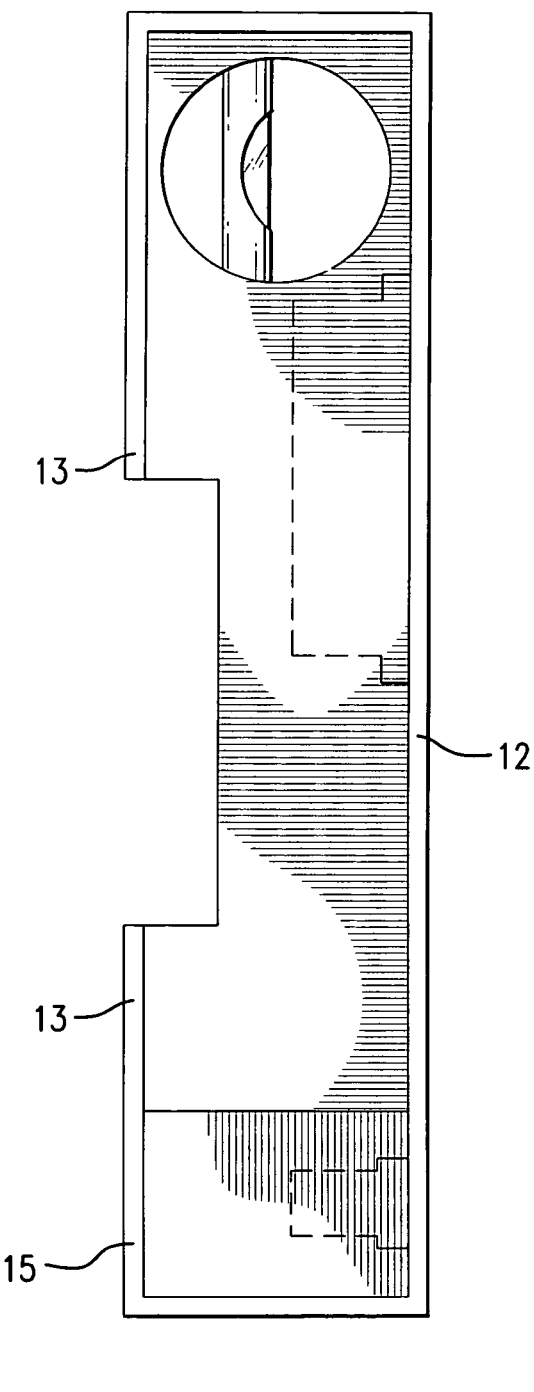
FIG. 3 is a full side view of a device of this invention with the top and bottom plates shown.

FIG. 3 is a full side view of a device 1 of this invention showing the top and bottom end plates for the device 1. The top plate 12 is shown on the base element 2 and the bottom plate is shown as 13, while plates 14 and 15 show the top and bottom plates, respectively of the tee bar 3.

The devices 1 of this invention can be manufactured from wood, metal, such as aluminum and stainless steel, and plastic.

The plates 10, 10', 11, 12, 13 and 14 are optional in that it is preferred that devices 1 of this invention made from wood, or plastic, need protection from daily use and these plates, either of metal, or plastic, provide such protection. The plates can be used to provide an aesthetic aspect to the devices 1.

The notch 9 is provided to straddle the top of a block such that readings can be taken with the device 1 while the block is in place, without the device 1 being subjected to ready movement. Also, the notch 9 allows the ability to surmount interlocking tabs on retaining wall blocks.

Typically, the glass levels 4 and 5 are countersunk in the top of the base element 2 rather than being mounted on top 6 of the base element 2 or the top 7 of the tee bar 3.

The front end 16 of the base element 2 is bonded or otherwise fixed to the back side 17 of the tee bar 3 such that the base element 2 is perpendicular to the tee bar 3 and such that the top surfaces or plates of the respective base element 2 and the tee bar 2 are on an even level. Obviously, the bottoms of each of the base element 2 and the tee bar 3 must be on the same level.

The glass levels used in this invention are standard glass bubble levels.

They are positioned on the device 1 such that the device 1 can have the advantage of being read from side to side and also from front to back, with the proviso that, the third glass level 8 can be used when the top mounted glass level 5 cannot be viewed by the user, and vice versa.

What is claimed is:

1. A leveling device for wall construction, said leveling device consisting essentially of a tee structure wherein there is a base element and a tee bar;

said base element having a bottom with a mid-point, a top, two opposing sides, a front end, and a back end;

said base element containing a first glass level component mounted in the top and a second glass level component mounted through the sides thereof;

said base element having a notch in the bottom thereof with one end of the notch being located at or near the bottom mid-point, said notch being configured to straddle a block;

said tee bar having a top, a bottom, front side and a back opposing side and two opposing ends, said top having a midpoint;

said tee bar having a third glass level component mounted in the top at essentially the top midpoint, the front of the base element being fixed perpendicularly to the back side of the tee bar wherein the top of the base element and top of the tee bar are on the same level and the bottom of the base element and the bottom of the tee bar are essentially level.

\* \* \* \* \*